Figure 4:
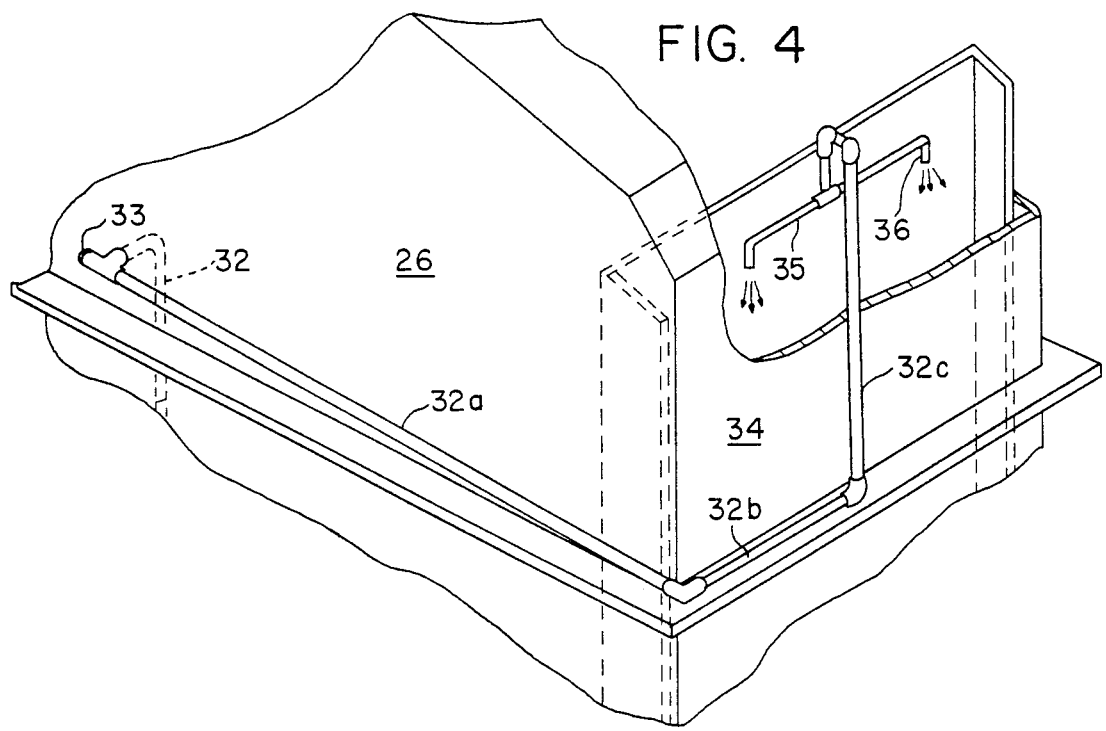

United States Patent [19]

White

[11] Patent Number: 5,005,227
[45] Date of Patent: Apr. 9, 1991

[54] COMPOSTING TOILET WITH RESPRAY OF LIQUID WASTES

[75] Inventor: Allen E. White, Millerton, Pa.

[73] Assignee: Clivus Multrum, Inc., Lawrence, Mass.

[21] Appl. No.: 320,521

[22] Filed: Mar. 8, 1989

[51] Int. Cl.⁵ .............................................. A47K 11/02
[52] U.S. Cl. ..................... 4/449; 4/DIG. 12
[58] Field of Search ................ 4/DIG. 12, DIG. 19, 4/111.6, 449, 462, 463, 474, 475, 476, 477, 459, 460, 482

[56] References Cited

U.S. PATENT DOCUMENTS

| | | | |
|---|---|---|---|
| 3,238,124 | 3/1966 | Burton | 4/DIG. 19 |
| 4,084,269 | 4/1978 | Lindstrom | 4/DIG. 12 |
| 4,163,294 | 8/1979 | Patterson | 4/449 |
| 4,213,864 | 7/1980 | Asikainen | 4/DIG. 12 |

FOREIGN PATENT DOCUMENTS 54595 9/1978 Finland ............................ 4/DIG. 12

Primary Examiner—Henry J. Recla
Assistant Examiner—David J. Walczak
Attorney, Agent, or Firm—Watson Cole

[57] ABSTRACT

A composting toilet disposes of quantities of liquid wastes by providing ingress and egress means for air into and from a housing for the wastes. Within the housing is means for conducting the air into the path of liquid waste being sprayed, to entrain or evaporate such waste into the air and pass it from the housing.

16 Claims, 2 Drawing Sheets

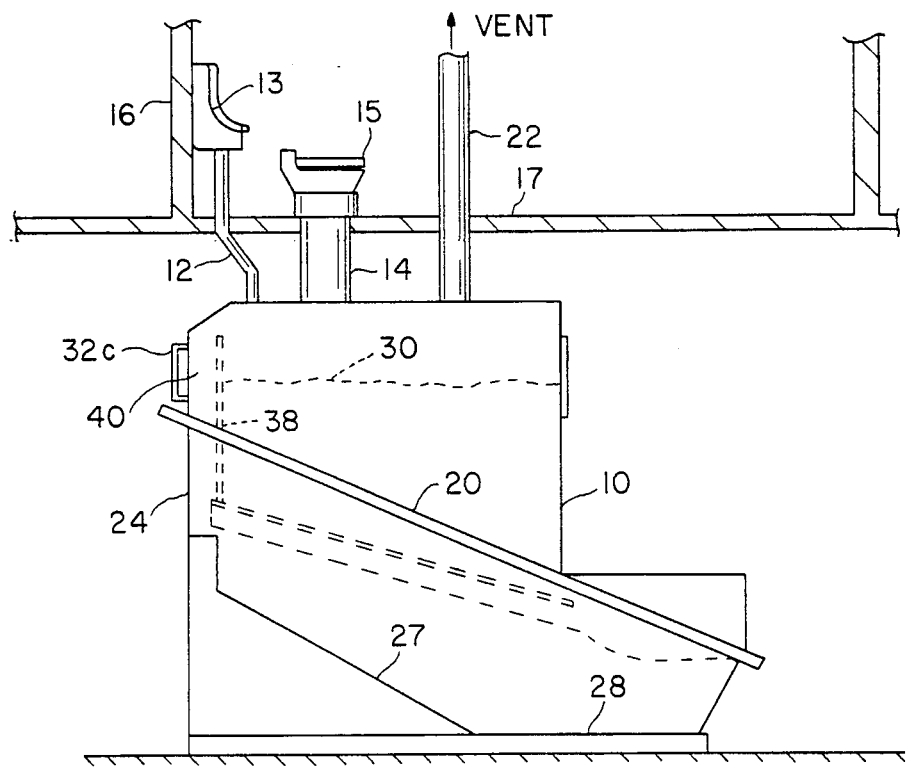
FIG. 1
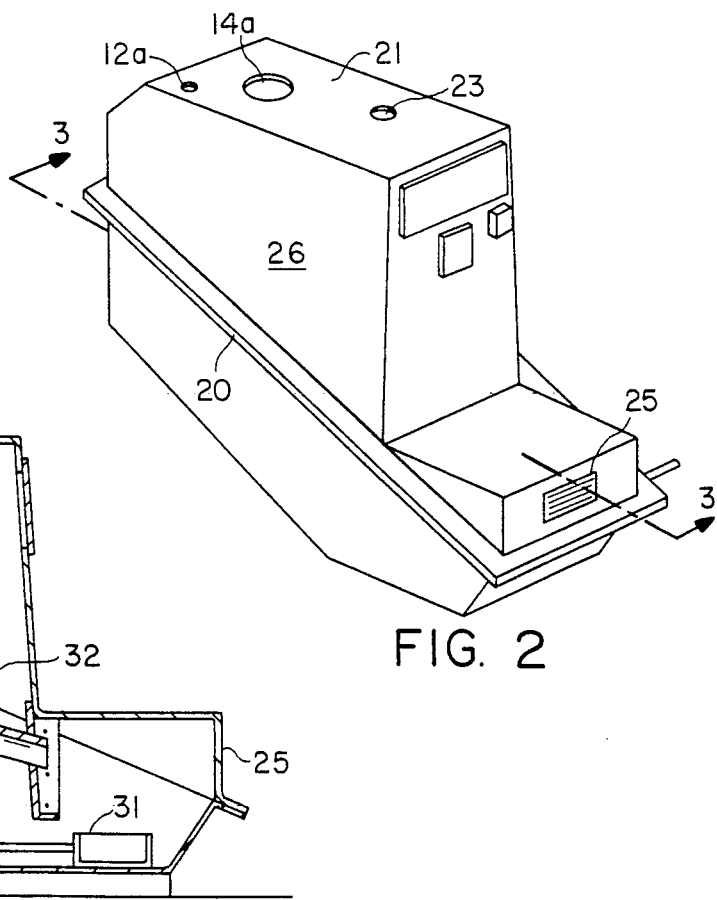
FIG. 2
FIG. 3

COMPOSTING TOILET WITH RESPRAY OF LIQUID WASTES

BACKGROUND OF THE INVENTION

The present invention relates in general to toilet facilities for receiving both liquid and solid wastes. More specifically, it relates to toilets which are self-composting, such as those particularly adapted for use by the public in outdoor areas where connections to a sewage line or other central disposal system for distributing wastes is unavailable or not cost effective.

THE RELEVANT ART

Composting toilets are well known in the art. Examples thereof are two patents to R. E. Lindstrom, U.S. Pat Nos. 3,136,608 and 4,084,269. In the latter in particular, the problem is recognized that, where a self-contained toilet unit is utilized to receive both liquid and solid waste, for example, in the form of urine and feces, the materials may be separated and conducted within the toilet in separate paths. Thus, U.S. Pat. No. 4,084,269 provides for separately collecting urine in a compartment separate from the main compartment in which solid wastes are collected, and then permitting the urine to flow down through the stack of waste material in the container, where that liquid may be absorbed by the solid waste and aid in the decomposition thereof. It is known that urine has a significant nitrogen content, since urea is a prime ingredient thereof and has the formula, $NH_2(CO)NH_2$. Still, the disposal of a large supply of liquid waste presents a problem: the nitrogenous content is desirable for use as a fertilizer; the volume is undersirable and must be removed from the composting toilet.

While the composting toilet disclosed in the more recent Lindstrom U.S. Pat. No. did represent a step forward in the art, it failed to solve the problem of excessive accumulation of liquid wastes in the housing position beneath the toilet facilities, and failed to take full advantage of the high nitrogen content of that waste, such as urine. It will be apparent that a urea containing material is well adapted to be used for the fertilizers value of its nitrogen, as slow release fertilizer today utilize urea-form nitrogen, as contrasted with inorganic nitrogen compositions, e.g., nitrate and ammonium fertilizers which release their nitrogen content far more rapidly.

The present invention meets the problem of excess accumulation of urine or other liquid wastes within the housing of a composting toilet in a manner that the prior art did not contemplate: it disposes of volatile components of such liquid wastes by evaporation and entrainment in air that is directed to pass through the housing. While retaining the less volatile components of the urine, which is highly nitrogenous, the more volatile components, such as water, are permitted to pass from the housing into the ambient air. In this manner the Present invention solves the problem of excess liquid accumulation, while at the same time retaining the high nitrogen-containing liquid for fertilizer use. In addition, these functions have been performed while maintaining the liquid content of the stack of solid wastes at a level where aerobic decomposition of the solids will still take place, and rather than have the solid waste stack be in the form of a thoroughly staturated mass where anaerobic decomposition is the only means of disposing of that waste, the liquid content is maintained at a more appropriate level where aerobic decomposition is encouraged.

SUMMARY OF THE INVENTION

In a broader form the present invention contemplates a composting toilet for the treatment of liquid and solid wastes and conversion thereof into biologically acceptable, disposable products. In that form, the toilet comprises a housing positioned for the reception of liquid and solid wastes, which housing has top, bottom and side walls for retaining wastes therewithin. Means are provided for collecting liquid wastes accumulating within the housing, for example, by having the bottom wall of the housing arranged on a slope so that the liquid will accumulate at one end thereof by gravity. In addition, means is provided for permitting ingress and egress of air that flows into the housing, within and then from the housing. Finally, the invention also comprises means for projecting liquid waste within the housing into the path of air moving between the ingress and egress means so that portions of the liquid waste are entrained with or evaporated into the air moving within the housing and are thereby removed from the housing along with that air.

Viewed somewhat more specifically, the housing may contain a pump which is located at a portion of the housing where liquid waste accumulates within the housing, e.g., a lowermost portion of the bottom wall of the housing. In such embodiment the pump will project liquid waste to an elevated portion within the housing, where the liquid waste will be sprayed into the flow of air moving through the housing.

In another aspect, the present invention contemplates a composting toilet where the housing positioned for the reception of liquid and solid wastes is divided into a major portion in which liquid and solid waste may be received, and a relatively minor portion that is substantially free of solid wastes. Means is provided for permitting ingress and egress of air into and from the housing, and such means extends within the housing into the minor portion thereof that is substantially free of solid wastes. Means is also provided for collecting liquid waste and projecting it within the housing into the minor portion thereof and into the flow of air moving through the minor portion, whereby portions of the liquid waste projected into the minor portion are entrained with or evaporate into the air passing through said portion and pass from the housing with that air.

In more specific embodiments a baffle extends from a location at the bottom wall of the housing to a location spaced from the top wall. The baffle divides the housing into its major and minor portions. The means for permitting egress of air from the housing includes a vent located in the top wall of the housing; the air leaving the housing, with its entrained and evaporated liquid waste, passes through that exhaust vent.

In still another aspect of my invention, the means for projecting liquid waste accumulated within the housing includes a pump and a conduit through which such waste is pumped to a position at the top of the minor portion of the housing and into the flow of air through that minor portion. Preferably, the conduit will extend through a wall, generally a side wall of the housing to the outside of the housing, then back through another wall of the housing, to a location at the top of the minor housing portion. Other features of this aspect of the invention include a tubular member for directing the flow of air from the ingress means to the minor portion of the housing, generally at a lower level of that minor portion. The tubular member may be in the form of an inverted U.

In still another aspect, the invention includes means for storing liquid wastes when the quantity of liquid wastes that accumulate at the vicinity of the pump exceed the capacity of the pump to project the liquid waste in the interior of the housing. Preferably, the pump is operable only when there is a predetermined level of liquid waste present, and when that level exceeds the pump capacity, the excess liquid is stored and then is returned from storage to the pump when the level of liquid waste at the pump has diminished below a predetermined level.

Expressed in the form of a method rather than apparatus, the present invention is a method of operating a composting toilet for treating liquid and solid wastes and converting them into biologically acceptable, disposable products. The basic method comprises providing a housing for the reception of wastes, passing air into, through and from the housing, collecting liquid wastes within the housing, and projecting the collected liquid wastes into the path of the air within the housing to entrain and evaporate portions of the liquid wastes into the air and remove those portions from the housing.

These and other objects, features and advantages of the present invention will become more apparent when considered in conjunction with a preferred embodiment of my invention, which is illustrated in two sheets of drawings in which:

FIG. 1 is a side elevation of the general layout of the composting toilet, illustrated beneath toilet facilities;

FIG. 2 is a perspective view of the housing;

FIG. 3 is a vertical sectional view taken along the line 3—3 of FIG. 2;

FIG. 4 is an enlarged, perspective view of the upper rear portion of the housing, partially broken away;

FIG. 5 is a top plan view of an installation of a plurality of housings operating as a unit, with an overflow storage tank, and FIG. 6 is a perspective view of a housing connected to such a storage tank.

Referring now to the drawings and in particular to FIG. 1 thereof, that Figure shows the general layout of a self-contained, composting toilet located beneath facilities into which liquid and solid wastes are deposited. Thus, a housing or tank 10 is illustrated, and serves as a repository for liquid wastes directed to the tank by pipe 12 from urinal 13. Solid wastes are funneled to the housing 10 by a conduit 14 located beneath commode 15, both the urinal and the commode being mounted on portions of an enclosed structure having a side wall 16 and floor 17.

With regard to the housing, itself, and particularly as shown in FIG. 2, it is formed from top and bottom portions which, when assembled, are united along joined flanges 20 extending around the exterior of the housing. As shown in FIG. 2, the top wall 21 of the housing has apertures 12*a* and 14*a* through which pipes 12 and 14, respectively, may be inserted. Another important part of the structure is a vent pipe 22, the aperture 23 of which is seen in FIG. 2. Also shown in FIG. 2 is the ingress means through which air is directed into the interior of the housing 10, that ingress means being in the form of a vent 25. For completeness, the housing 10 is also shown with a side wall 26 in FIG. 2.

In FIGS. 1 and 3 the bottom wall of the housing will be more clearly seen, such bottom wall being identified by reference numeral 27. Referring now specifically to FIGS. 1 and 3, the bottom wall of the housing 10 slopes at an angle of about 30 degrees to a lowermost portion 28, to which liquid wastes entering the tank, e.g., through pipe 12, ultimately collect. A large portion of those liquid wastes will flow by gravity through the solid wastes, accumulated in the tank to a level indicated generally by reference numeral 30 in FIG. 1, and thereafter through the solid wastes to the bottom 27 of the housing 10. Then the liquid wastes will flow, again by gravity, down the slope bottom wall 27 to the collecting portion 28 of the housing bottom.

At such collecting portion a pump 31 is disposed (FIG. 3). The pump 31 serves to pump collected liquid wastes from collecting portion 28 to an elevated part of the tank 10. In my preferred embodiment, the pump 31 projects liquid through conduit 32 in the interior of the tank, and then through an aperture in side wall 26 of the tank to the exterior of that housing. As will best be seen in FIG. 4 of the drawings, conduit 32 exits the housing side wall 26 and then proceeds along the exterior of the housing past a clean out plug 33, to exterior lengths 32*a*, 32*b* and 32*c*, which are joined by conventional elbow joints. Conduit 32 then passes through another exterior wall of the tank, such as back wall 34 or top wall 21, and thence within the tank to a spreader 35 terminating in orifices 36. In this manner liquid waste, as long as it accumulates to a sufficient degree in collection portion 28 of bottom wall 27, is pumped by pump 31 to a location within the housing 10.

The location in which the orifices 36 project liquid wastes back into the tank is a feature of the present invention. As best seen in FIGS. 1 and 3, a baffle 38 separates the interior of the tank size-wise into a major waste receiving portion 39 and a relatively minor portion 40, the latter being disposed so that solid wastes are not received therewithin. That minor portion or compartment 40 is located so that the only wastes that will be pumped therewithin will be liquid wastes from the pump 31. Because the air entering the housing 10 does so primarily or totally through intake vent 25, that air is then directed from the vent through a lowermost portion of the housing and into an air conduit 42, shown in FIG. 3 both in its exterior form and partially broken away. Preferably, that conduit 42 is in the form of an inverted U. Conduit 42 extends from a location near the vent 25 through the baffle 38 at the base of the minor portion or compartment 40. In this manner air from the ingress means 25 will be directed within the interior of the housing through air conduit 42 and into compartment 40, where liquid wastes from spray heads 36 will pass into contact with it. Air issuing from that compartment, with evaporated water and entrained water from the liquid wastes as sprayed into compartment 40, will be moved from that compartment into the exhaust vent 22, and thereafter from the toilet facility. A draft is created by conventional power means mounted in the exhaust vent 22. Liquid wastes that are not carried away with the air flow from the bottom of compartment 40 at its juncture with inverted U conduit 42 are recycled by pump 31 back to the spray heads 36.

An additional feature of my invention is illustrated in FIGS. 5 and 6. In FIG. 5 a series of three housings 10*a*, 10*b* and 10*c* are shown. Only housing 10*c* employs a liquid waste pump, 31; housings 10*a* and 10*b* instead have liquid drain cages 11*a* and 11*b* located approximately at the location of the pump 31. The function of the liquid drain cages 11a and 11b is to permit excess fluid accumulating in the collecting portions 28 of the bottom walls of the housing to flow from tanks 10a and 10b to 10c when they exceed predetermined levels, through conduits 17a and 17b. In order to conserve resources, only housing 10c need employ a spray pump 31, which then sprays fluid waste through orifices 36a, 36b and 36c located respectively in tanks 10a, 10b and 10c. By this means a single pumP can operate to spray liquid for evaporation within a plurality of tanks, in the FIG. 5 embodiment, three tanks.

Figure 6:
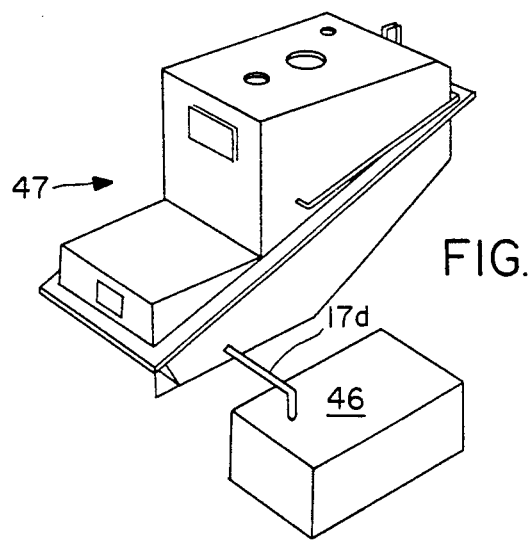

It is another feature of the present invention which remedies waste accumulations during a period of Particularly of heavy use of composting toilets. For example, in a park facility during a summer weekend, the quantity of liquid waste that accumulates may be in excess of the capacity of the PumPs that are used in the tanks, in this case, pump 31 located in housing 10c. When such a situation occurs, as monitored by suitable electronic means (not shown), a valve 44 is energized to direct excess fluid through a further conduit 17c into a holding tank 45. That holding tank may be located at a lower level than the housing. As shown in FIG. 6, tank 46 is used to hold excess liquid wastes and is located so that, rather than have the pump operate to force liquid wastes through conduit 17d into holding tank 46, the orifice of the conduit within the housing 47 can be so located that there will be an automatic overflow of liquid wastes within the housing when the pump within that housing cannot maintain a lower level of liquid wastes. When the liquid wastes exceed the capacity of the Pump, the level of liquid within the housing 47 will flow through pipe 17d and into overflow tank 46, located so that there is a gravity feed into tank 46.

In a further aspect of the present invention, means can be provided in either of the holding tanks 45 and 46 for directing excess liquid wastes therein back into the tank from which they were removed when the supply of liquid wastes in that tank diminishes. Thus, after a summer weekend in which the facilities were used to the fullest, means can also be provided to pump liquid wastes from a holding tank such as tank 45 back into a housing 10c and to the vicinity of the pump 31 therein. Thereafter, the returned fluid will be pumped so that it issues from orifices or heads 36a, 36b and 36c within their respective tanks, 10a, 10b and 10c.

Figure 5:
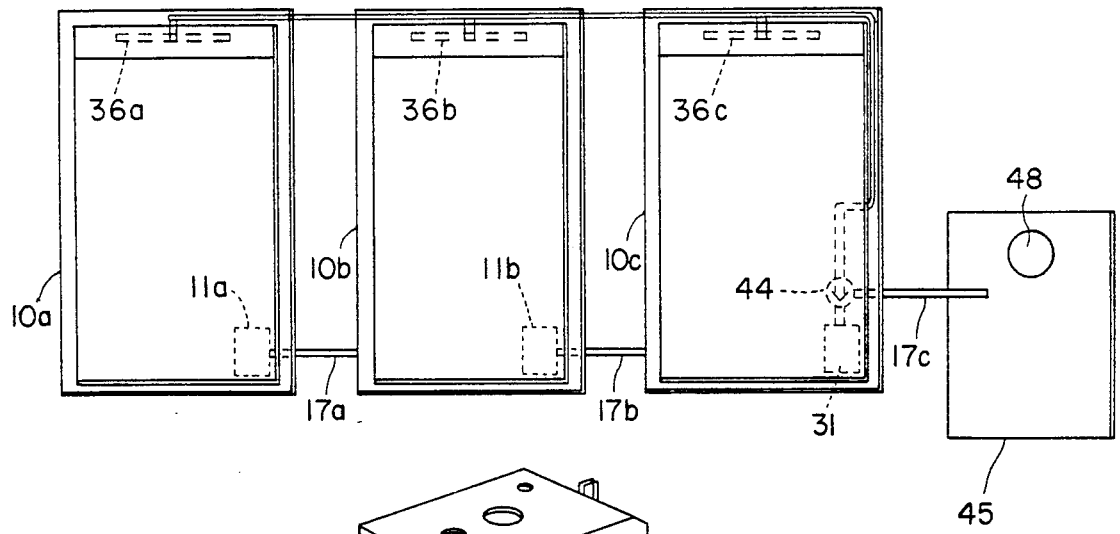

Finally, where the system shown in FIG. 5, for example, has been in operation for a significant period of time, the liquid wastes that finally collect at the pump 31 will be concentrated, since more volatile portions, such as water, will have been substantially diminished by spraying such liquid wastes. In that case fluids passing into holding tank 45 through conduit 17c will have a relatively high nitrogen content, and will be valuable for their fertilizer properties. Where it is desired to utilize those concentrated waste liquids, they can be removed by suitable means, such as through orifice 48 in holding tank 45.

By means of the present invention, a preferred embodiment of which has been described herein, it will be seen that a composting toilet has been described which operates as a self-contained unit and in which decomposed solid wastes will accumulate for periodic removal. With regard to liquid wastes, their quantity will be greatly diminished because they are being evaporated and entrained with air issuing from a vent in the top of the housing, and the liquid wastes that do accumulate will be concentrated to an extent whereby they will be nitrogen rich, thereby enhancing their value as fertilizer or in aiding in the decomposition of the solid wastes by being directed back over those solid wastes, where their high nitrogen content enhances bacterial growth.

While the present invention has been described with respect to a preferred embodiment thereof, it will be apparent that those of skill in this art will recognize that alterations and modifications may be made to the apparatus and the method of the invention without changing the inherent nature thereof. As to all such obvious alterations and modifications, it is desired that they be included within the purview of my invention, which is to be limited only by the scope of the claims appended hereto, including equivalents thereof.

What is claimed is:

1. A composting toilet for the treatment of liquid and solid wastes and conversion thereof into biologically acceptable, disposable products, comprising:

a housing including means for the reception of liquid and solid wastes, said housing having top, bottom and side walls for retaining said wastes therewithin;

means dividing said housing into a major portion in which said liquid and solid wastes are received, and a relatively minor portion substantially free of solid wastes; said portions being arranged in substantial juxtaposition within said housing;

means for permitting ingress and egress of air into and from said housing, said ingress and egress means being located remote from each other, said means extending within said housing from a location near said ingress means, to a location in said minor portion of said housing;

means for collecting liquid waste accumulating within said housing, and means for projecting said liquid waste within said housing into said minor portion of said housing and into the flow of air moving through said minor portion toward egress from said housing, so that portions of said liquid waste projected into said minor portion are entrained with or evaporate into said air and pass from said housing with said air.

2. A composting toilet as claimed in claim 1, in which said bottom wall of said housing is canted to form a lower, liquid-collecting portion.

3. A composting toilet as claimed in claim 2, in which said projecting means includes a pump located at said liquid-collecting portion.

4. A composting toilet as claimed in claim 1, in which said projecting means includes a pump for pumping collected liquid waste to an elevated location within said housing.

5. A composting toilet as claimed in claim 4, in which said projecting means further includes means for spraying said liquid waste within said housing at said elevated location.

6. A composting toilet as claimed in claim 1, in which said major and minor portions of said housing are separated by a baffle, said baffle extending from a location at said bottom wall of said housing to a location spaced from said top wall of said housing.

7. A composting toilet as claimed in claim 1, in which said means for permitting egress of air from said housing includes a vent located in the top wall thereof.

8. A composting toilet as claimed in claim 1, in which said means for permitting ingress and egress of air directs air through said housing into said minor portion, through the top thereof, and out said egress with said entrained and evaporated liquid waste.

9. A composting toilet as claimed in claim 1, in which said projecting means includes a conduit extending from said means for collecting liquid waste accumulating within said housing to a position at the top of said minor portion of said housing, and a pump located at said collecting means for pumping said liquid waste through conduit and into the flow of air through said minor portion.

10. A composting toilet as claimed in claim 9, in which said conduit extends through a wall of said housing to the exterior thereof, and then back into said housing to said position at the top of said minor portion thereof.

11. A composting toilet as claimed in claim 1, wherein said means for permitting ingress and engress of air within said housing includes a generally tubular member extending from a location near said ingress means to said minor portion of said housing.

12. A composting toilet as claimed in claim 11, in which said generally tubular member is in the form of an inverted U.

13. A composting toilet as claimed in claim 13, in which said generally tubular member enters said minor portion of said housing at a lower level thereof.

14. A composting toilet as claimed in claim 1 further including
   means separate from said housing for storing said liquid waste when the quantity of said liquid waste in said housing collecting means exceeds a predetermined amount, and
   means including a pump at said collecting means for projecting said liquid within said housing into the path of said air moving through said housing so that portions of said liquid waste evaporate or are entrained with said air and removed from said housing with said air.

15. A composting toilet as claimed in claim 14, further including means for returning liquid waste stored in said storage means to said collecting means when the liquid waste at said pump fall below a predetermined level.

16. A composting toilet as claimed in claim 14, in which said pump is operable to pump liquid waste only when said waste is present in a predetermined amount.

* * * * *